(12) United States Patent
Rubbert

(10) Patent No.: US 7,887,258 B2
(45) Date of Patent: Feb. 15, 2011

(54) INTAKE APPARATUS FOR DAMS

(76) Inventor: Mark Rubbert, 2660 NE. Highway 20, #610-303, Bend, OR (US) 97701

( * ) Notice: Subject to any disclaimer, the term of this patent is extended or adjusted under 35 U.S.C. 154(b) by 481 days.

(21) Appl. No.: 11/731,016

(22) Filed: Mar. 28, 2007

(65) Prior Publication Data

US 2007/0269268 A1 Nov. 22, 2007

Related U.S. Application Data

(60) Provisional application No. 60/786,966, filed on Mar. 28, 2006.

(51) Int. Cl.
*E02B 8/08* (2006.01)
(52) U.S. Cl. .............. 405/81; 405/78; 405/107
(58) Field of Classification Search .......... 405/78, 405/80–83, 96, 97, 107–117
See application file for complete search history.

(56) References Cited

U.S. PATENT DOCUMENTS

| | | | | | |
|---|---|---|---|---|---|
| 3,555,829 A | * | 1/1971 | Trewhella | ............... | 405/87 |
| 3,701,260 A | * | 10/1972 | Soileau | ............... | 405/88 |
| 3,832,854 A | * | 9/1974 | Metts | ............... | 405/88 |
| 3,854,291 A | * | 12/1974 | Perkins | ............... | 405/108 |
| 3,863,605 A | * | 2/1975 | Gallup | ............... | 405/80 |
| 4,091,624 A | * | 5/1978 | Steinke | ............... | 405/96 |
| 4,182,123 A | * | 1/1980 | Ueda | ............... | 405/78 |
| 4,364,228 A | * | 12/1982 | Eller | ............... | 405/78 |
| 4,437,017 A | * | 3/1984 | Osterberg | ............... | 405/78 |
| 4,481,904 A | * | 11/1984 | Fletcher | ............... | 405/81 |
| 5,284,402 A | * | 2/1994 | Del Villar | ............... | 405/127 |
| 6,102,619 A | * | 8/2000 | Truebe et al. | ............... | 405/81 |
| 6,213,684 B1 | * | 4/2001 | Fowler et al. | ............... | 405/127 |
| 6,325,570 B1 | * | 12/2001 | Pohjamo | ............... | 405/81 |
| 6,575,662 B2 | * | 6/2003 | French | ............... | 405/80 |
| 6,712,555 B1 | * | 3/2004 | Truebe et al. | ............... | 405/81 |
| 2002/0044835 A1 | * | 4/2002 | Esposito et al. | ............... | 405/80 |
| 2003/0039512 A1 | * | 2/2003 | Bethune | ............... | 405/75 |

* cited by examiner

*Primary Examiner*—Frederick L Lagman

(57) ABSTRACT

A dam bypass apparatus including a floating inlet and a flexible conduit having a discharge opening adjacent to a dam water intake. The inlet can be laterally offset from the discharge opening, and can include screens to exclude debris from the conduit.

37 Claims, 19 Drawing Sheets

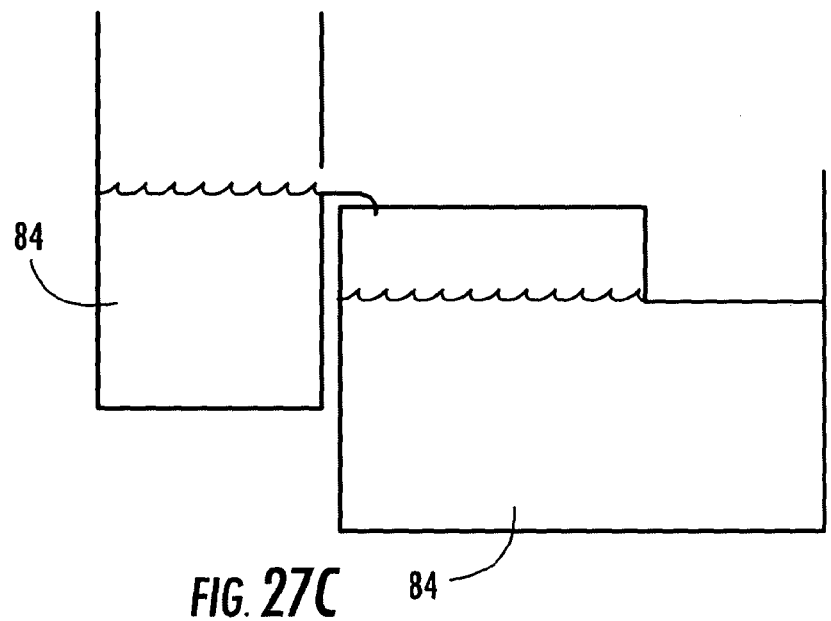
FIG. 27C
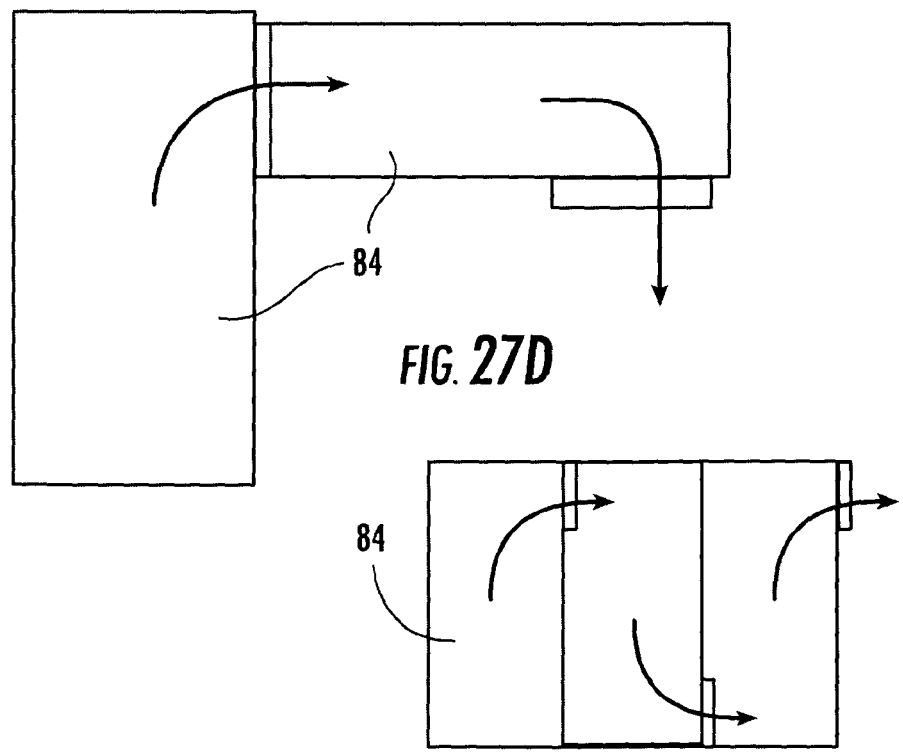
FIG. 27D
FIG. 27E

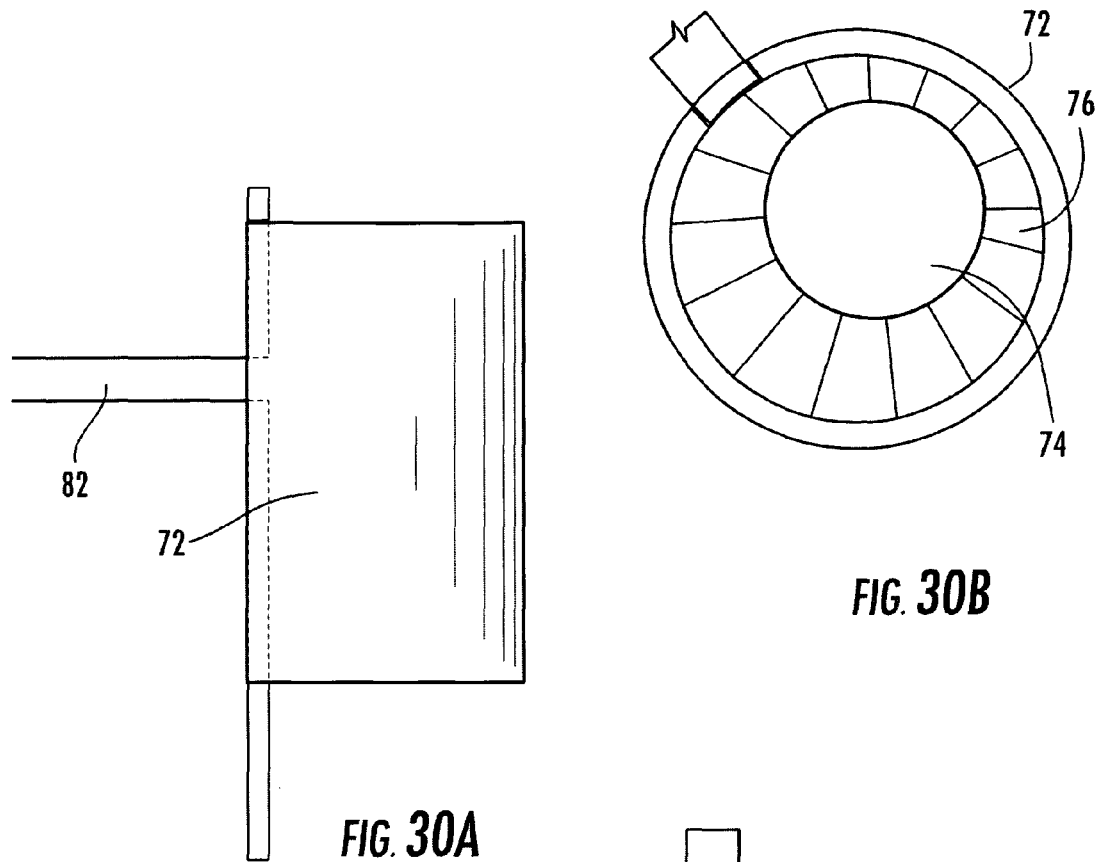
FIG. 30A
FIG. 30B
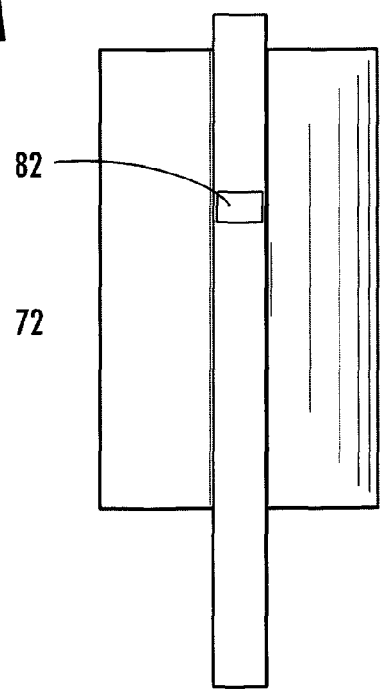
FIG. 31

INTAKE APPARATUS FOR DAMS

RELATED APPLICATIONS

This application claims priority to U.S. Ser. No. 60/786,966, filed on Mar. 28, 2006.

BACKGROUND

This invention relates to the management of water flows through dams, and in particular to an apparatus that enables dam operators to discharge through the dam a variable blend of water from around the surface and the lower depths of the reservoir.

Dam operators are often required to manage water flow through hydroelectric dams so that the discharge from the turbines is of a desired temperature, oxygen content, or other criteria. These requirements can be directed toward fish passage through the dam or fish habitat requirements below the dam, e.g. water temperature, oxygen content, etc. Dam operators attempt to meet these requirements by introducing into the turbine intakes, or turbine bypass intakes, or spilling, water from various depths in the impoundment. In some cases, the intakes are several hundred feet below the water surface. Various structures have been proposed for this purpose, but so far none are satisfactory due to either their high cost, or the technical difficulties in building, operating or maintaining the structures, or the power generation revenue lost from excessive spilling.

BRIEF DESCRIPTION OF THE DRAWINGS

FIGS. 30a-31 illustrate a helical vane pump that is vertically adjustable relative to a fixed outlet position in the housing.

DESCRIPTION OF THE PREFERRED EMBODIMENTS OF THE INVENTION

Figure 1:
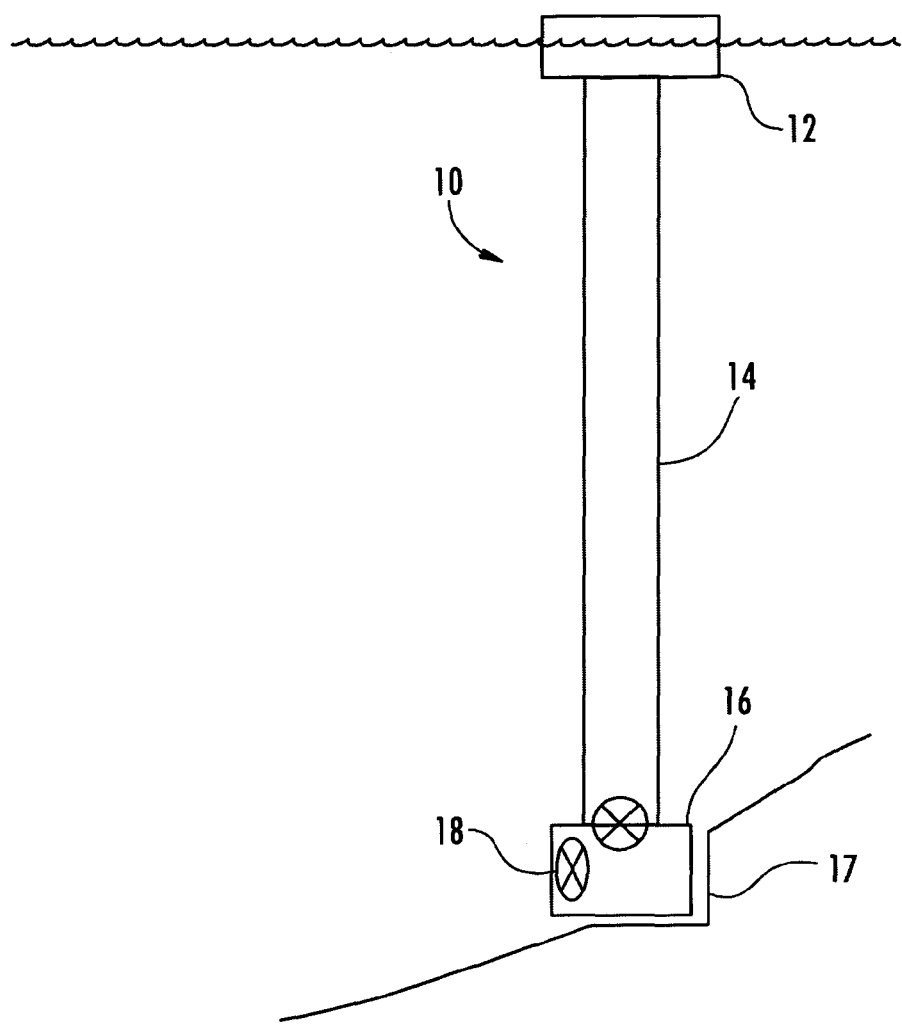
FIG. 1 shows a first embodiment of the invention that includes a floating intake, an adjustable vertical conduit and a discharge.

This invention includes a number of embodiments that address the unmet need in the prior art, and which enable a dam operator to vary the blend of water from the surface (or a number of depths above the bottom) with water at or near the bottom of the dam structure or intake. Referring to FIGS. 1-12, the invention, is embodied in an apparatus 10 that includes a floating intake structure 12 that is positioned at or near the water surface, and which is connected to a conduit or tube 14 to direct surface water down to the desired depth, i.e. the location of the turbine intake or bypass. (FIG. 1). The tube 14 is designed to provide a variable length, and can be telescoping or collapsible to provide the necessary depth. The lower end of the tube is attached to the intake structure 16 of the dam 17, and in preferred embodiments includes gates 18 to control the amount of surface water flowing into the surface intake and deep water flowing into the adapting structure, and in that way the ratio of surface water to water from the vicinity of the turbine intake.

Figure 2:
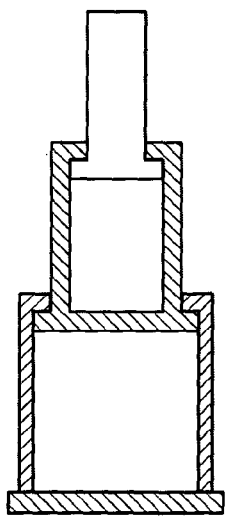
FIGS. 2-9 illustrate various embodiments of the adjustable vertical conduit.
Figure 2A:
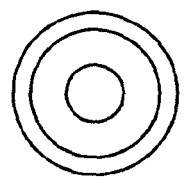
Figure 3:
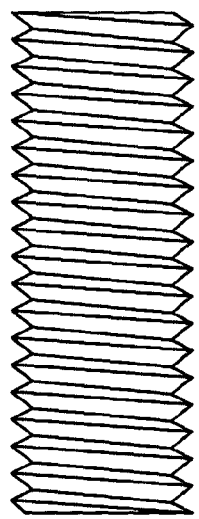
Figure 4:
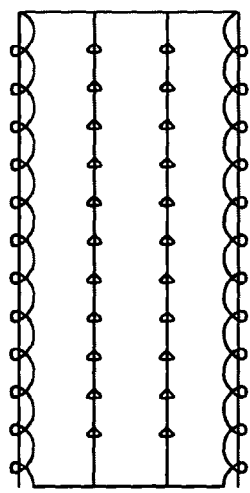
Figure 4A:
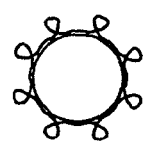
Figure 5:
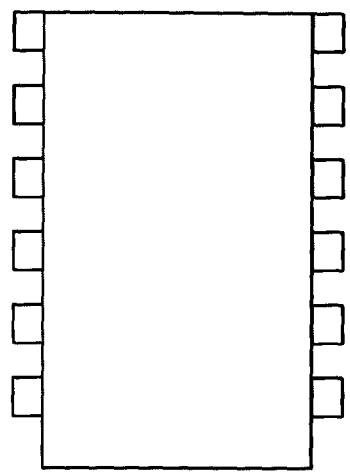
Figure 6:
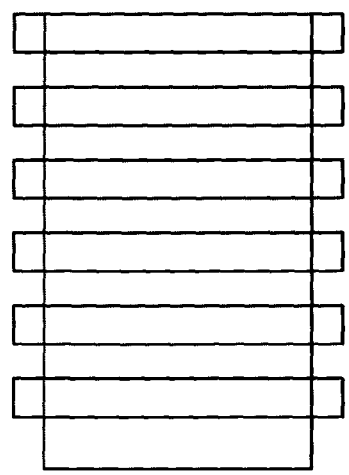
Figure 7:
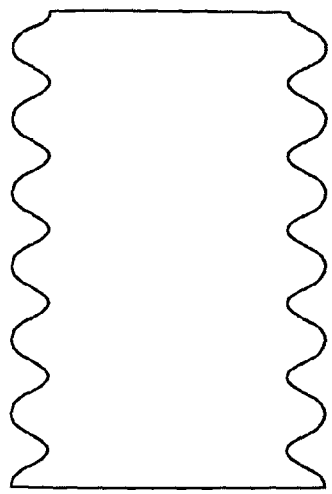
Figure 8:
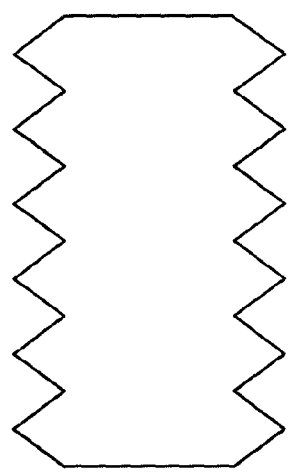
Figure 9:
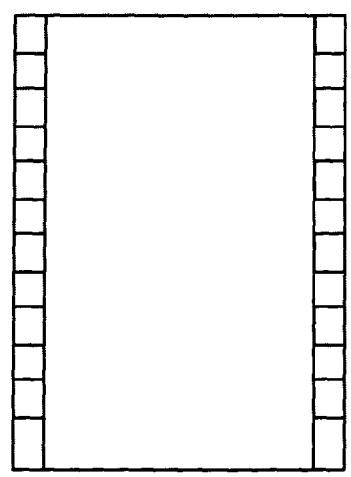

Several types of tube structure are shown in FIGS. 2-4, and include a telescoping assembly of tubes (FIG. 2), a collapsible plastic tube (FIG. 3), and a fabric tube suspended on cables strung between the surface intake and the lower end of the tube. The majority of the weight of the tubes is suspended from the surface intake structure. This greatly reduces the amount of structure and bracing required to adapt the down tube to the turbine intakes. Some examples of tube wall designs are shown in FIGS. 5-9. Interior or exterior structures or braces, or both, as needed, may reinforce the tubes. The variable length of the tube allows for variations in water surface height above the intake. The flexibility of the tube also accommodates normal water movement in the reservoir, as well as wind forces and earthquake movements. The invention envisions any number of metallic or polymeric materials that would be suitable for the tube, depending on the specific engineering requirements of a particular application. Considerations in the choice of materials include weight, flexibility, water permeability, and durability.

Figure 10:
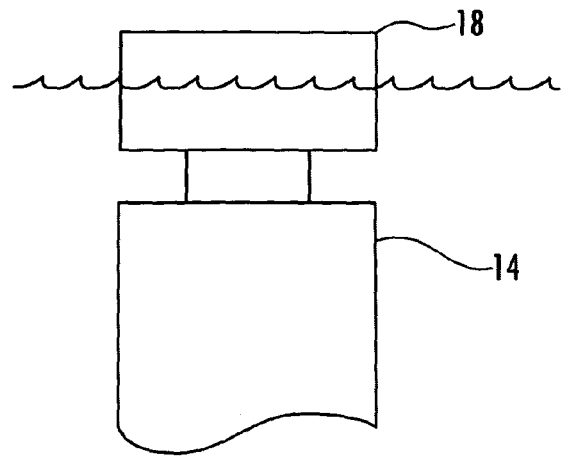
FIGS. 10-12 show alternate conduit inlet designs.
Figure 11:
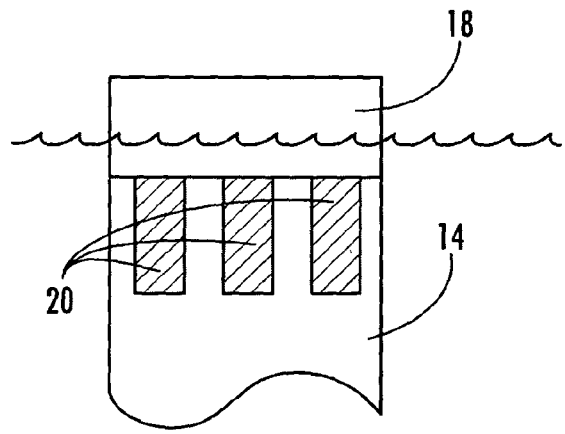
Figure 12:
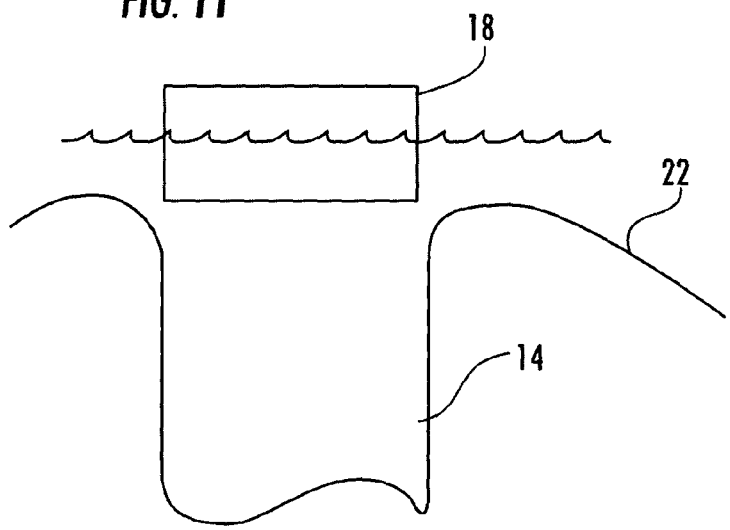

Referring to FIGS. 10-12 the invention includes a number of different configurations and designs for the water intake structure 18. One advantage of the invention is that the intake can be adapted for a specific application, and can be operated in a number of different modes in a specific application. For instance, the point of water intake can be easily moved from one location to another relative to the dam. The intake inlet can be extended vertically to collect water from a range of depths near the surface. It can also be slightly submerged to draw water from just beneath the surface to exclude materials typically found floating on the surface. In one embodiment utilizing a slip ring construction the intake inlet can be oriented in any direction (e.g. toward the dam, away from the wind, etc) to optimize the operation. Alternatively the inlet could extend around the intake structure to draw water from all around the intake. (FIG. 10) The intake can also be throttled by operable gates, discs, or by other mechanical valve mechanisms 20 known to those of skill in the art. (FIG. 11) In this embodiment the gates can be opened selectively to provide full flow, or to limit the intake to particular positions around the intake. In one embodiment the intake is includes a sloped shelf 22, which is used to collect or contain fish smolts. The shelf can be configured to present the appearance of gravel, sand, or any other natural material if desired.

Figure 13:
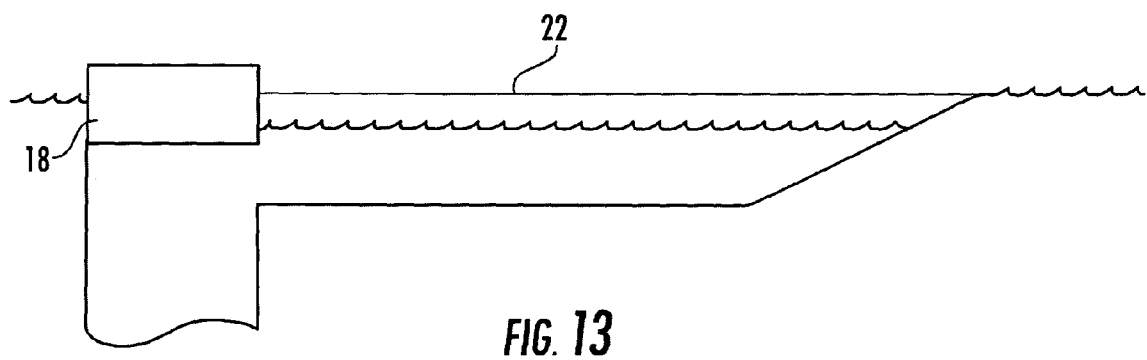
FIGS. 13 and 14 illustrate a laterally offset inlet connected to the conduit by a lateral channel.
Figure 14:
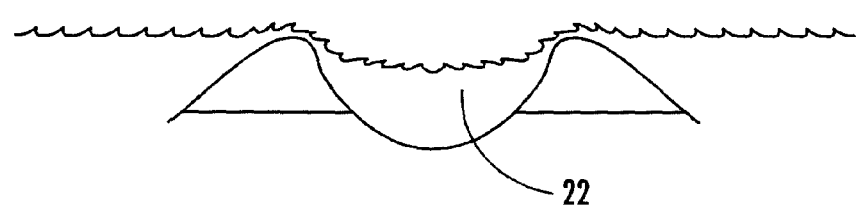

A combination intake can be used wherein the intake is laterally offset from the down tube. Referring to FIGS. 13 and 14, the intake 18 can include a lateral channel that can simulate a river leaving a lake. The lateral channel can be angled to create a natural current. The structure of the channel may incorporate features to assist in the capture of fish smolts in the channel.

Those of skill in the art will recognize that any of the intake structures could and should include a protective grate or cover that permits water to freely flow into the intake, but which excludes debris, animals and of course any person that might venture too close to the inlet.

Figure 15:
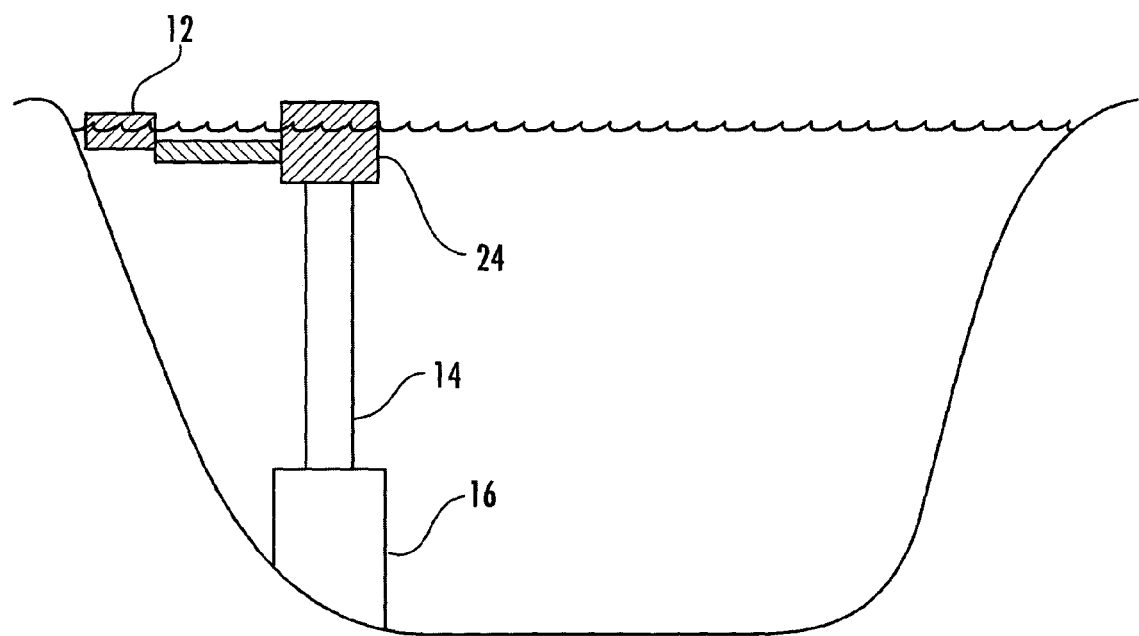
FIG. 15 shows another embodiment with a laterally offset inlet.

Turning now to FIG. 15, in certain applications it might be preferable to draw surface water from a shallow area laterally offset from the drop tube 14. In those instances, the drop tube 14 can be supported by a floating intake structure 24. The inlet is located away from the intake structure and connected by a lateral conduit 26 that directs water from the inlet to the intake structure and tube. The lateral tube is preferably a flexible, light structure that can be readily moved, and in a preferred embodiment the lateral tube is assembled from segments that can be linked together to provide any desired length. Alternatively the lateral tube can be telescoping, or of a flexible material that also accommodates variation in length.

This intake arrangement can be readily added to the earlier-described embodiments as a means of adapting the basic structure to a particular location. The variability and adaptability of the intake structure is of particular interest to those concerned with the movement of fish through the impoundment behind a dam. Warm, stagnant water near the surface can injure and/or disorient both smolts headed downstream and adults headed up. This invention allows easy modification of the surface intake, as required, to produce surface currents in the impoundment that promote fish passage. The surface temperature may also be reduced by selecting the warm surface layer to be drawn from the reservoir, mixed with cold water from the bottom, and sent downstream. A short series of trials will reveal the optimum configuration of the intake quickly and economically.

The floats for the structure can be formed integrally with the down tube or lateral tube, or can be separate structures that can be attached and removed separately. They may be constructed as solid, buoyant structures, or as hollow assemblies. Floats can be used on various portions of different embodiments. For example in the embodiment just described, floats can be attached to the lateral tube to suspend it between the inlet and the intake structure, and reduce stress on the connections between the lateral tube and the intake structure.

Figure 16:
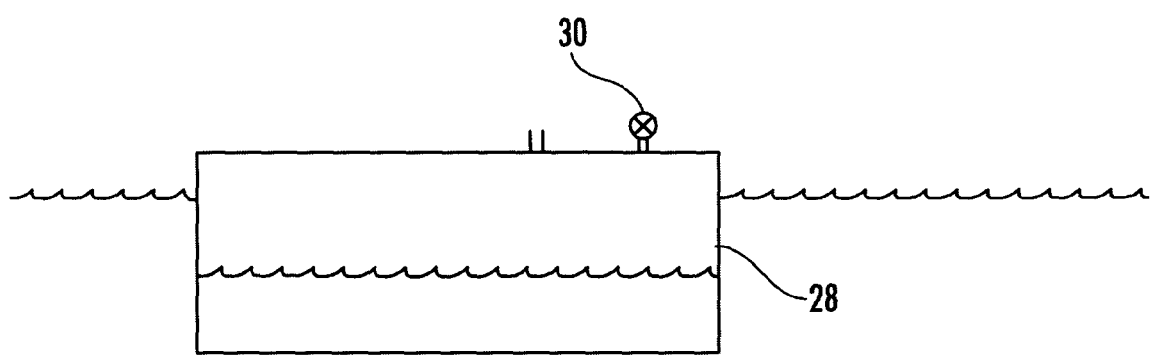
FIG. 16 is a schematic illustration of an inlet that can be raised or lowered in the water by the use of compressed air to vary the buoyancy of the inlet structure.

Referring to FIG. 16, in one embodiment an adjustable float 28 is provided in which a chamber contains water and compressed air. The chamber is vented to the surrounding water from beneath the water level within the chamber. A compressed air inlet 30 is provided to introduce compressed air into the chamber as a means of varying the buoyancy of the float chamber. The invention envisions any number of metallic or polymeric materials, depending on the specific engineering requirements of a particular application.

Figure 17:
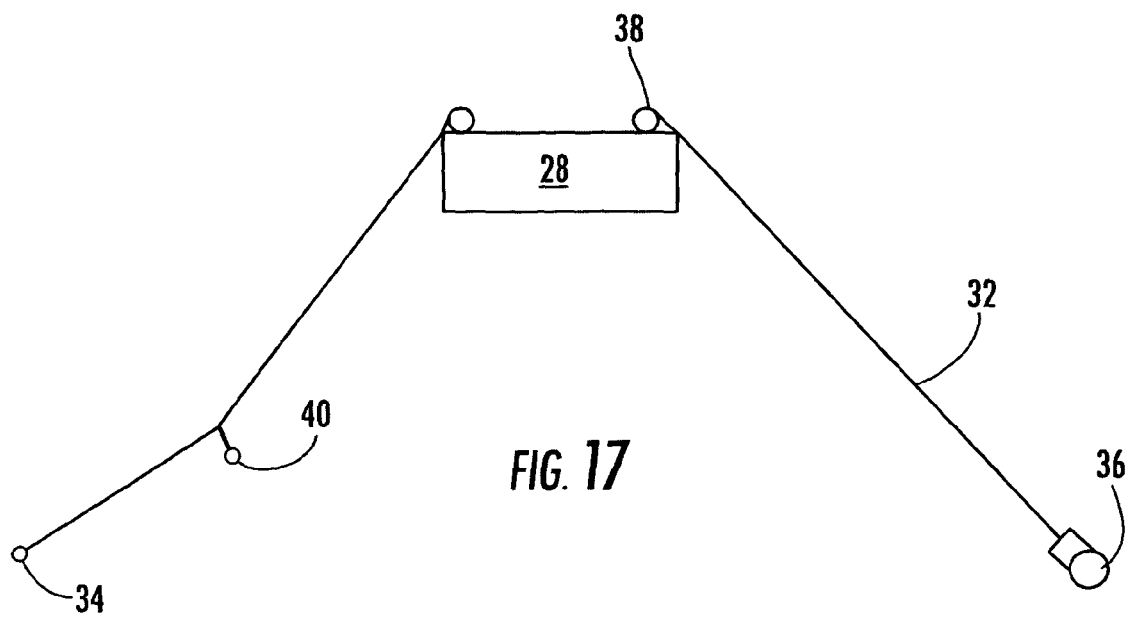
FIGS. 17-19 illustrate anchor systems to fix the inlet in position while permitting it to be raised and lowered relative to the dam.
Figure 18:
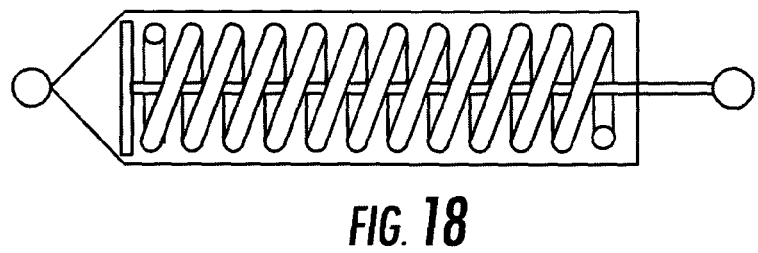
Figure 19:
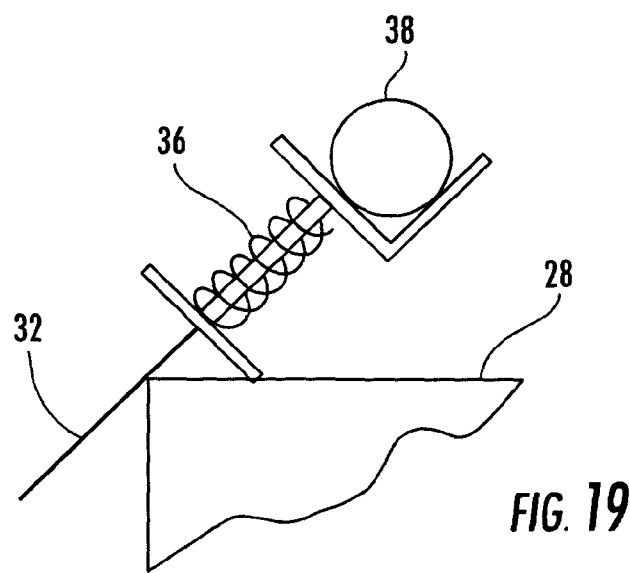

Referring now to FIGS. 17-19, the structures of the invention must be anchored so as not to move around due to currents or winds. FIGS. 17-19 illustrate several aspects of guy lines that could be used to anchor the structure. The guy lines 32 can be attached to fixed anchor points 34 as available in a particular setting, and which could include anchors affixed to the dam structure, anchors affixed to surrounding rocks, or other suitable structure. Shock relieving structures 36 are preferred as shown as is well-known to those of skill in the art. The guy lines are preferably adjustable to permit adjustments as water levels rise and fall, and to permit adjustment of the position of the structure without having to release it from its anchor points. To this end the guy lines could be mounted on winches 38 that can be operated to extend or retract a particular line as needed. In some instances it might be preferable to include weights 40 on the lines to eliminate slack as the structure moves about, and to essentially pretension the lines.

Figure 20:
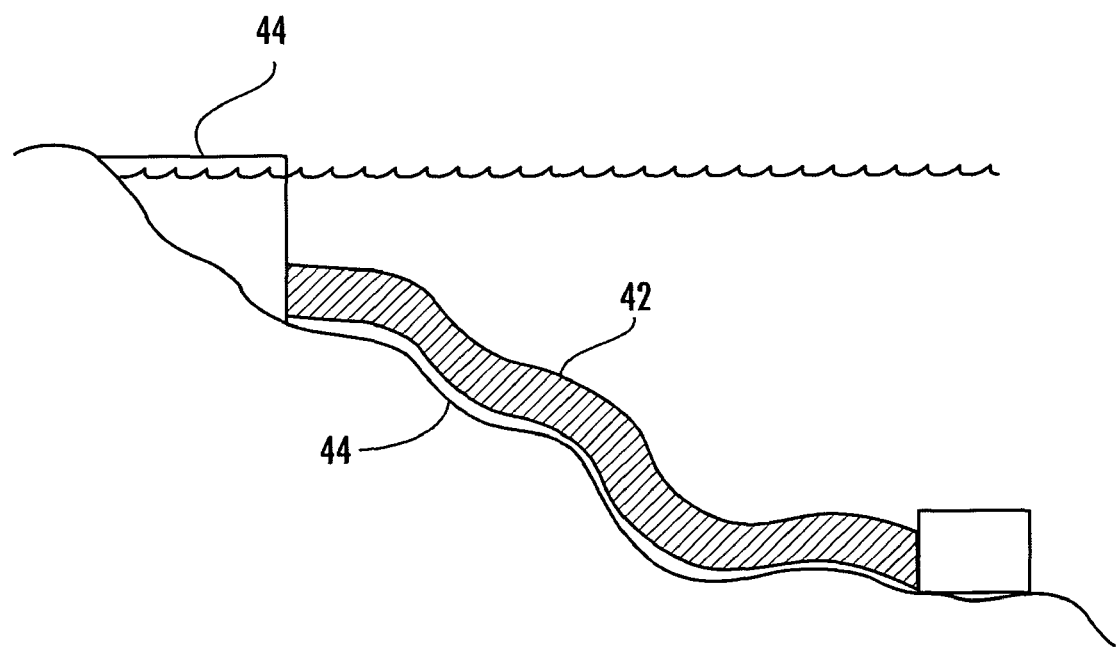
FIG. 20 is a illustrates a laterally offset inlet that is anchored to the bottom or bank of the reservoir.

Referring now to FIG. 20, in certain applications a suspended drop tube might not be the preferable design. Instead, a flexible transfer pipe 42 is provided and which lies along a sloped bottom 44 between a fixed or floating intake structure and the turbine intake 46. As with the earlier described embodiments the structure includes a connection device that attaches the lower end of the tube to the turbine inlet. In this embodiment the tube 42 is preferably a flexible polymeric structure, although the invention is not limited to any particular material.

Figure 21:
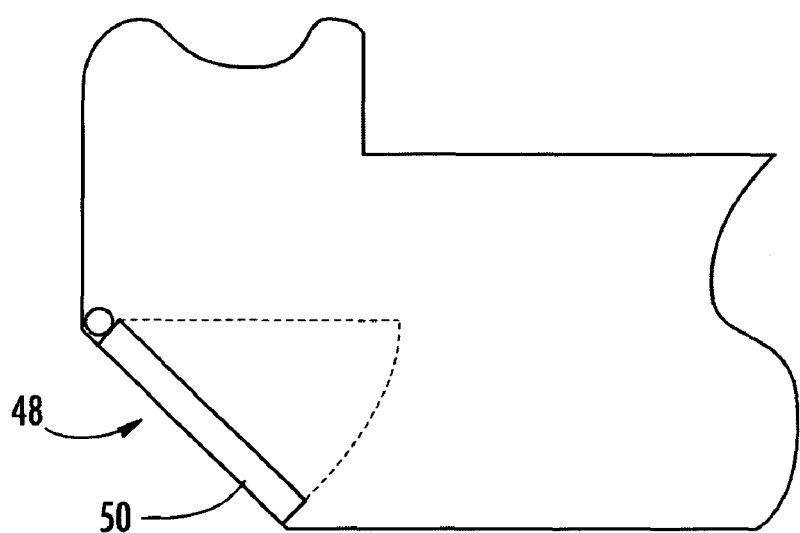
FIG. 21 illustrates a pressure relief structure that admits water to pressurize the down tube and prevent its collapse in the absence of water flow through the inlet.

Turning to FIG. 21, all embodiments of this device preferably include a pressure activated emergency safety gate(s) 48. If for some reason water flow into the structure was restricted, the resulting pressure differential would destroy the structure almost instantly. A simple gate 48 is shown in FIG. 21. A door 50 is set in an inclined frame and hinged at the top. If pressure outside the structure becomes higher than the pressure inside the structure by a certain amount, the door will swing up, allowing water to flow into the structure. The system can be designed for any minimum and maximum allowable pressure differential and any desired flow. These same gates can be used as the adapter structure mixing gates, as long as they are not prevented from operating as emergency pressure relief gates at any time.

Figure 22:
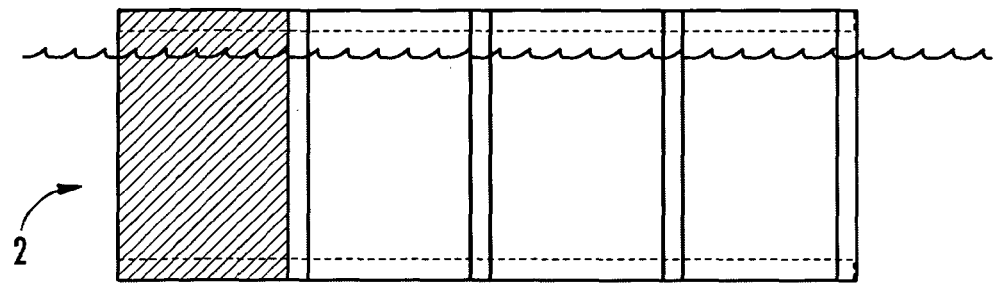
FIGS. 22-24c illustrate various screen assemblies used to exclude debris from the downtube.
Figure 23:
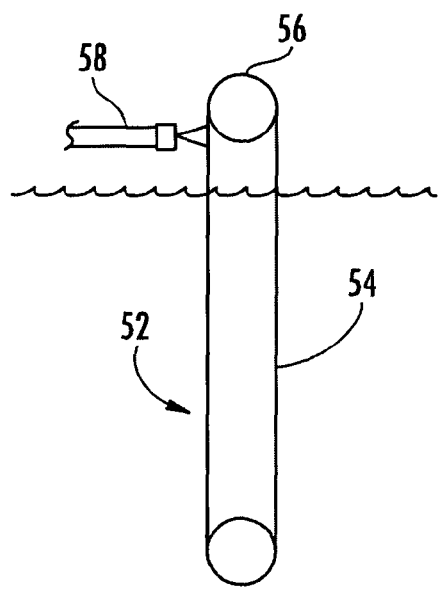
Figure 24A:
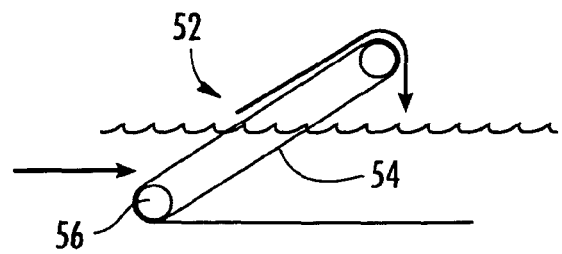

In many applications a fish screen will be required to exclude fish, particularly smolts, from entering the intake and tube. Referring to FIG. 22 in one embodiment of the invention the intake includes a fixed screen assembly 52 placed in the path of the water flow. Referring to FIGS. 23-24c, alternatively screen assembly 52 can include one or more continuous screens 54 mounted on a driven roller assembly 56. The screens serve to exclude fish and solid debris from the intake. As the screens 54 accumulate debris, the roller assemblies 56 are actuated to rotate a fresh screen section into place, and can also include a pressure washing nozzle 58. In one embodiment (FIG. 23) the screens are positioned vertically and divide the intake structure into upstream and downstream sections, with all down tube flow passing laterally through the screens. All smolts, debris, and other fish are directed to a turbine bypass device. In an alternate embodiment (FIG. 24), the screen can be placed at an angle in the intake structure. In this embodiment the debris tends to remain on the screens and be removed from the water rather than passing through the system.

Figure 24B:
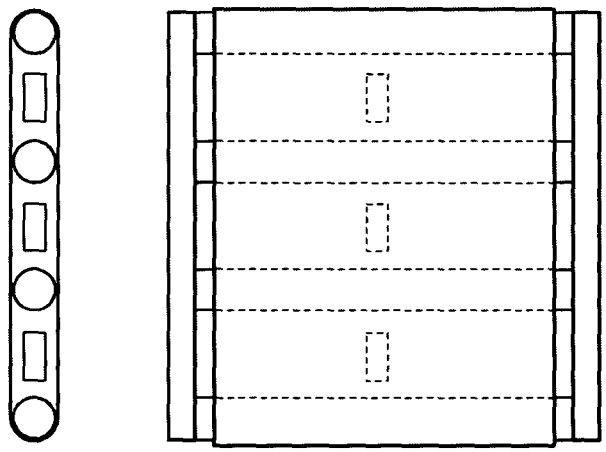
Figure 24C:
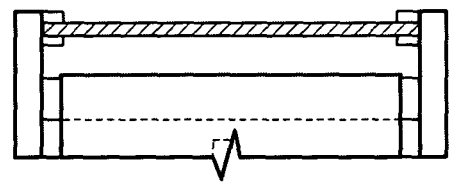

Intermediate rollers or supports might be needed to support the screens over longer spans (FIG. 24b). A system of blocking plates should be part of the screen design as shown in FIG. 24c. The plate is preferably impermeable to partially or totally block each screen. The plate serves to allow for removal of the screen for repair or replacement without allowing fish or debris into the turbine intakes. The blocking plates could also be adjustable to allow for throttling water flow through the screens.

Figure 25:
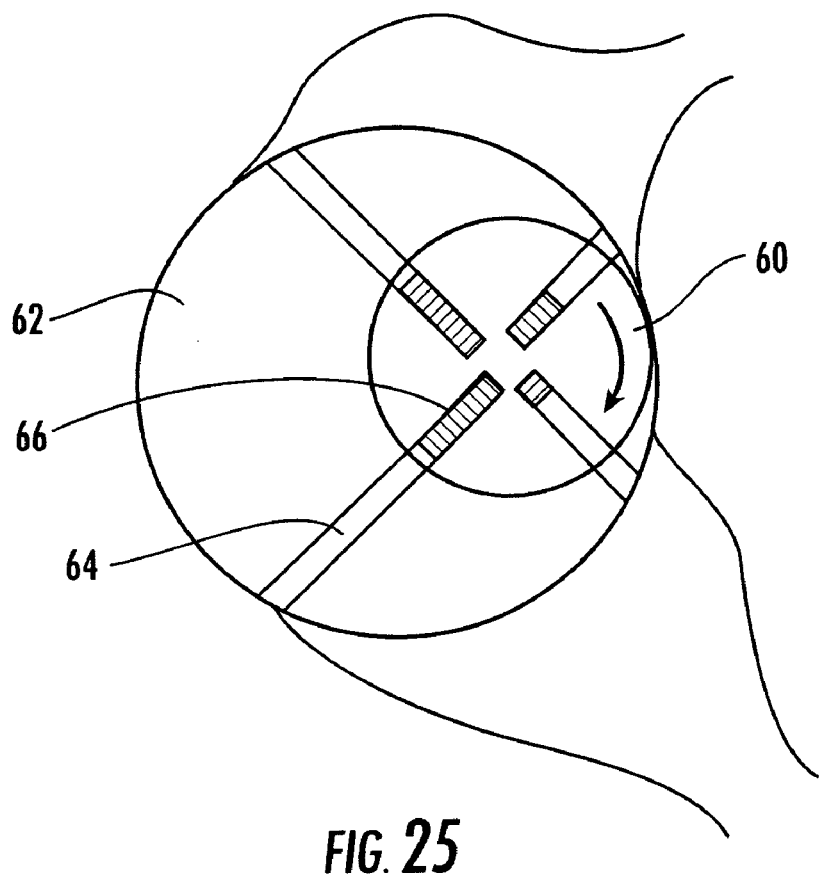
FIG. 25 is a schematic cross-sectional view of a rotary vane pump according to the invention.
Figure 25A:
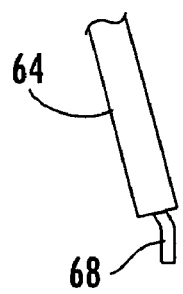
FIG. 25a is a partial top view of a vane of the rotary vane pump showing the distal end of the vane and a resilient material mounted on the end of the vane.

One problem confronted by dam operators is to reliably move smolts through the dam. Current practices can result in smolt losses from narcosis, disorientation and predation, pumping injuries, turbulent shear force injuries and more. This invention can address this problem by optionally including a vane pump in the turbine bypass device. Referring to FIG. 25 in one embodiment the mechanism includes a rotor 60 in a housing 62. The rotating axis of the rotor 62 is offset from the central axis of the housing, and includes several spring actuated, variable length vanes 64. As the rotor 60 is rotated, the springs 66 urge the vanes 64 outwardly against the housing 62 creating discrete volumes of water that are sequentially rotated through the housing. The pump may be adapted to avoid smolt injury through several embodiments. The first is to make the pump very large and slow moving. This will reduce pressure gradients in the water, and allow the smolts to avoid contact with the pump structure. A second feature would be to have a wiper of soft material at the point the vanes initiate contact with the pump housing (FIG. 25a). Any smolt caught by the vane would be pressed into the wiper until the vane had passed, then released without injury. In an alternate embodiment a recess is formed in the housing adjacent the inlet. A resilient material is positioned in the recess and deforms around a smolt that would happen to find itself between the vane tip and the pump housing as the vane sweeps across the inlet.

Figure 25B:
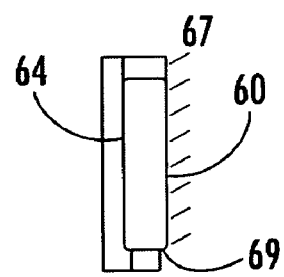
FIGS. 25b-c illustrate one embodiment of the vane pump showing upper and lower tracks mounted in the housing to engage the vane.
Figure 25C:
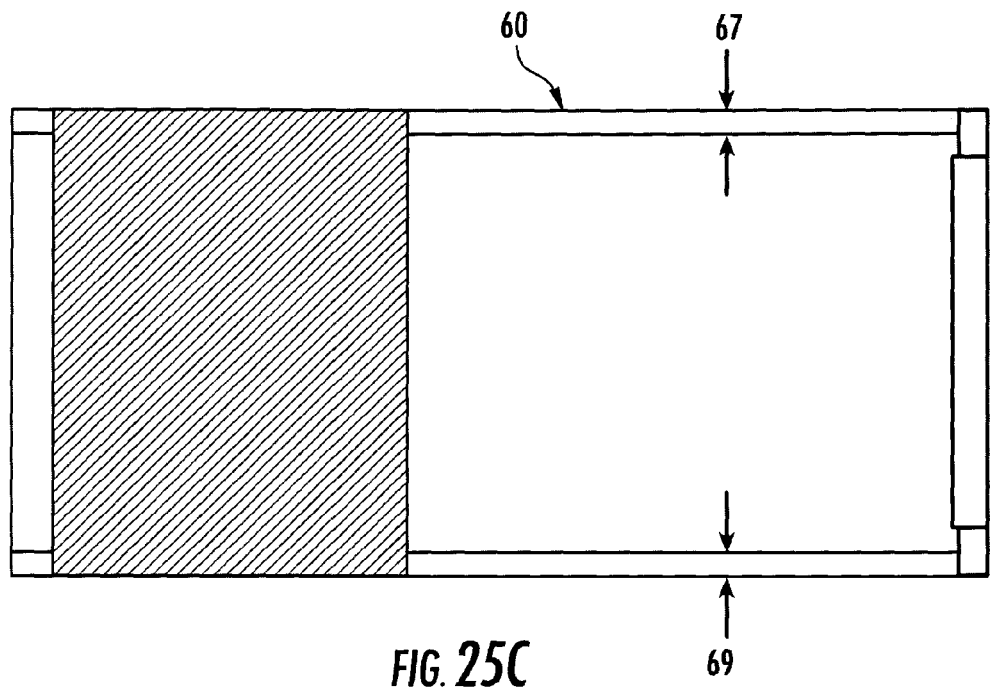

Another embodiment (FIG. 25b, 25c) would have the vanes contacting the housing only at bearing tracks 67, 69 at the top and bottom of the housing 60. A gap large enough to pass smolts without injury would be left in the middle. The pump efficiency would be lowered, but because of the low pressure and large displacement it would still work.

It is desirable for the springs between the vanes and the rotor to have constant force over a range of motion. This will eliminate any net load on the rotor from the vane springs. One embodiment of these springs would feature a constant pressure hydraulic reservoir acting on hydraulic cylinders. The cylinders act between the vanes and the rotor, expanding and contracting as the vanes move relative to the rotor. With constant hydraulic pressure, the force between the vanes and rotor would remain constant.

Figure 26A:
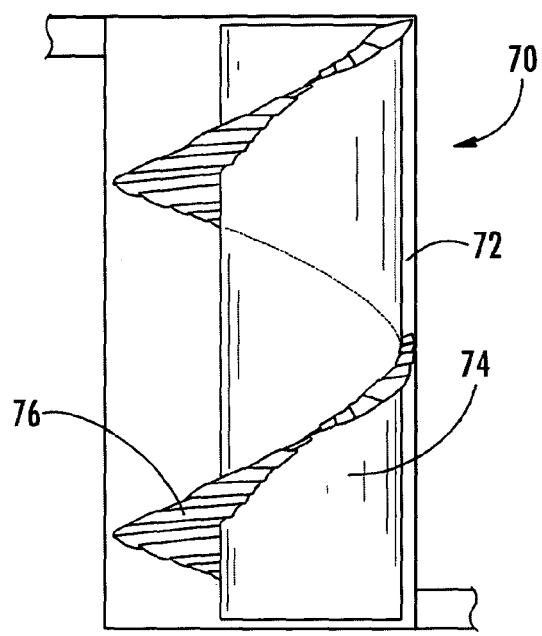
FIGS. 26a and 26b illustrate a helical vane pump according to one embodiment of the invention.
Figure 26B:
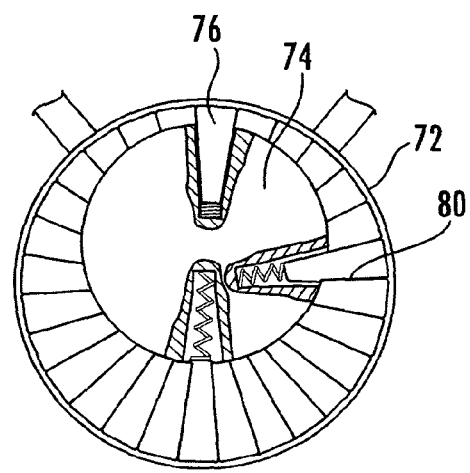
Figure 29A:
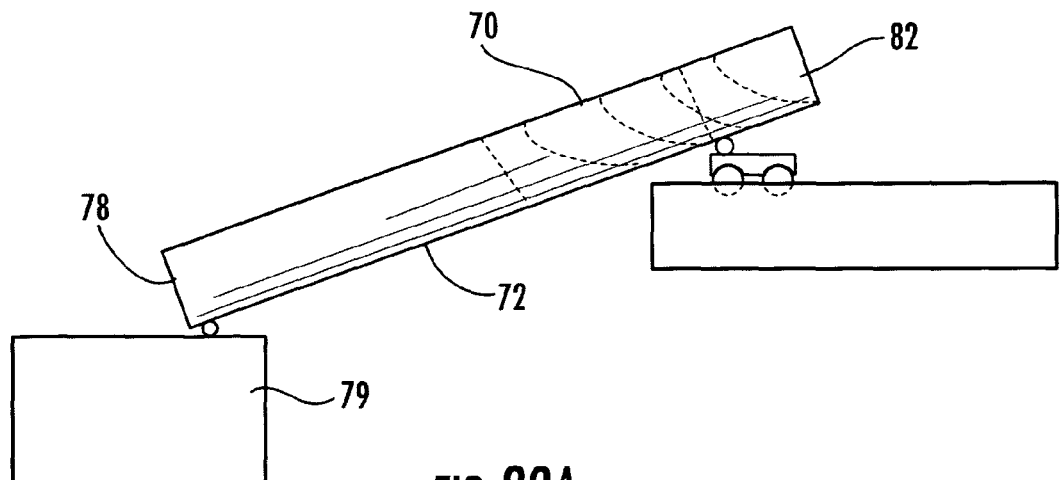
FIGS. 29a, b illustrate an embodiment in which the rotary vane pump inlet can be raised or lowered relative to the pump outlet.
Figure 29B:
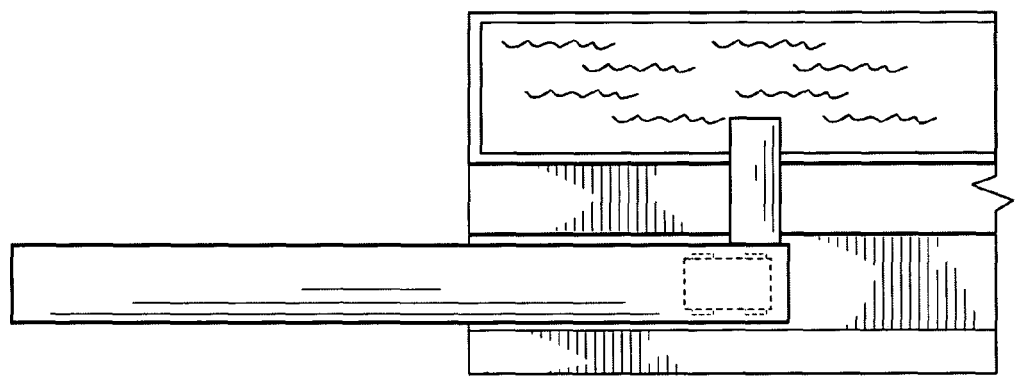

Other pump designs could also be used. Another embodiment of this invention uses a vane pump with a vertical rotor and continuous, segmented, helical vanes, FIGS. 26a, 26b. Pump 70 includes a housing 72, an eccentric rotor 74, and a plurality of extendable vanes 76 mounted on rotor 74 in a helical pattern so that as the rotor is turned water is lifted from the inlet 78 to the discharge 80. Each vane 76 is slidable in a radial direction and it urged outwardly against the housing 60 by a spring 80. This pump would operate at low rotational velocity and maintain atmospheric pressure on the fluid pumped while lifting it to the required elevation, doing so in a slow and gentle manner. This would avoid narcosis, disorientation, and physical injury of smolts in water. In one embodiment (FIGS. 29a, 29b) the helical vane pump housing can be raised or lowered relative to a fixed outlet 82 to draw water and smolts from a variety of depths below the fixed outlet 82.

In other embodiments fish ladders can also be incorporated into the design. In one embodiment shown in FIGS. 27a-e the fish ladder includes a number of portable, modular vessels 84 that are positioned adjacent one another in series and vertically offset from one another to provide the necessary vertical lift. As in a typical fish ladder water flows down the ladder from module to module and provides enough water volume at a sufficiently low velocity to permit anadromous fish to climb the ladder and reach the higher water level. These modular units may be pre-made onsite or at a remote location. They may be made of any material satisfying the engineering requirements of the design, although light weight materials such as plastics will make movement and installation of the modules much easier and more economical. Several alternate layouts are shown in FIG. 27b-27e.

Figure 27A:
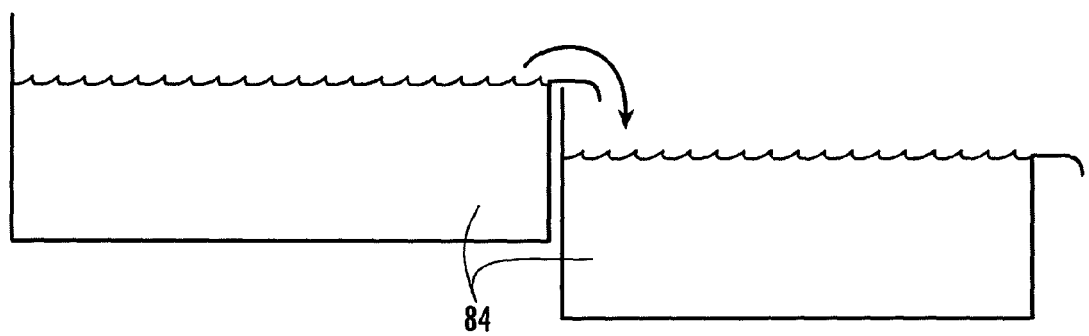
FIGS. 27a 28 illustrate several embodiments of a modular fish ladder according to the invention.
Figure 27B:
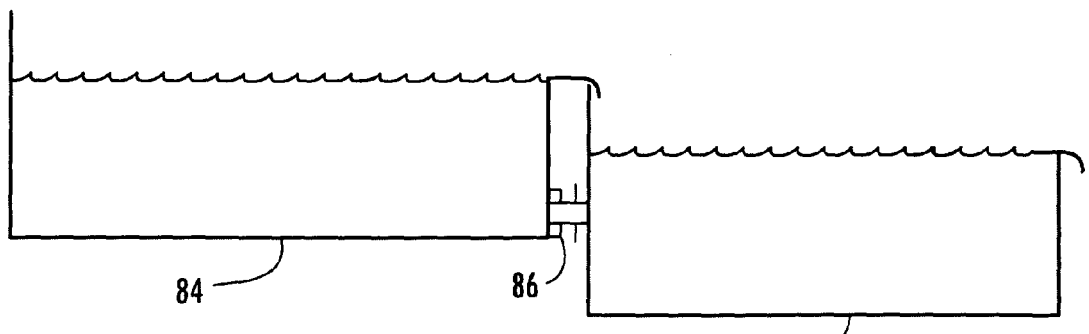

In one embodiment shown in FIG. 27b adjacent modules are interconnected by one or more conduits 86 below the water surface. In alternate embodiments the conduits can be mounted in the sidewalls of adjacent modules and can provide some flexibility between modules to permit relative movement between modules.

Figure 28:
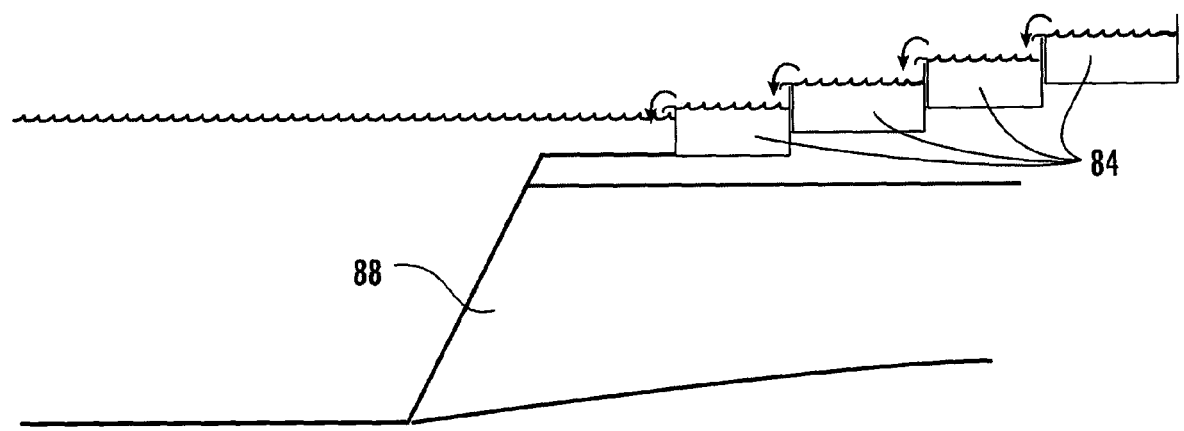

Turning to FIG. 28, the outfall of the fish ladder may be mixed with the turbine tail water below the dam. Flow velocities must be matched to avoid smolt injury, and should be designed to avoid disorientation of the smolts. Part of the outfall structure may include a screen 88 or weir directing migrating adult fish to the fish ladder.

While the invention has been described by reference to the foregoing preferred embodiments, those of skill in the art will appreciate that the preferred embodiments could be modified in arrangement and detail without departing from the scope of the invention.

The invention claimed is:

1. In a dam having an upper portion, a lower portion, and a water intake adjacent the base portion of the dam, a water mixing apparatus for transferring water from adjacent the upper portion of the dam to the water intake, the apparatus comprising:
   a buoyant surface water inlet operable to receive water from adjacent the upper portion of the dam;
   a water discharge adjacent the dam water intake; and,
   an adjustable down tube connecting the surface water inlet and the water discharge.

2. A water mixing apparatus according to claim 1 wherein the water discharge adjacent the water intake of the dam includes a flow regulating device.

3. A water mixing apparatus according to claim 1 wherein the surface water inlet is operable to be positioned at a predetermined location relative to the upper portion of the dam.

4. A water mixing apparatus according to claim 1 wherein the surface water inlet is supported at least in part by the adjustable downtube.

5. A water mixing apparatus according to claim 1 wherein the adjustable downtube is operable to vary in length to correspond to the distance between the surface water inlet and the water discharge.

6. A water mixing apparatus according to claim 1 wherein the surface water intake is laterally offset from the water discharge.

7. A water mixing apparatus according to claim 1 wherein the adjustable downtube comprises a flexible conduit.

8. A water mixing apparatus according to claim 1 wherein the adjustable downtube comprises a plurality of telescoping interconnected members.

9. A water mixing apparatus according to claim 1 wherein the adjustable downtube is formed of a material selected from the group consisting of a polymeric material, a metallic material, a fibrous material, a resinous material, a composite material, and a cementous material.

10. A water mixing apparatus according to claim 1 wherein the surface water intake is adjustable relative to the surface of the water to vary the rate of flow of surface water into the surface water intake.

11. A water mixing apparatus according to claim 1 wherein the water discharge includes a flow regulator to regulate the rate of flow of surface water into the surface water intake.

12. A water mixing apparatus according to claim 1 wherein the surface water inlet is anchored.

13. A water mixing apparatus according to claim 12 wherein the surface water inlet anchor includes a fixed member and an elongated member connecting the fixed member and the surface water inlet.

14. A water mixing apparatus according to claim 13 wherein the elongate member is operable to vary the distance between the anchor and the surface water inlet.

15. A water mixing apparatus according to claim 13 wherein the surface water inlet anchor further includes a tensioner connected to the elongate member.

16. A water mixing apparatus according to claim 13 wherein the surface water inlet anchor wherein the elongate member includes a cable and a winch connected to the elongate member.

17. A water mixing apparatus according to claim 1 wherein the surface water inlet is mounted in a fixed position relative to the dam.

18. A water mixing apparatus according to claim 1 wherein the surface water intake includes a screening device for excluding materials from the surface water intake.

19. A water mixing apparatus according to claim 18 wherein the screening device includes an inlet opening in a wall of the surface water intake and a screen covering at least a portion of the opening.

20. A water mixing apparatus according to claim 19 wherein the screening device comprises a screening material that includes a plurality of screening sections and which is operable to selectively position at least one of the plurality of screening portions adjacent the inlet opening.

21. A water mixing apparatus according to claim 20 wherein the screening device further comprising at least one cover which is operable to regulate water flow into the inlet opening.

22. A water mixing apparatus according to claim 19 wherein the screening material comprises a continuous loop of screening material.

23. A water mixing apparatus according to claim 1 further comprising a turbine bypass mechanism which is operable to transfer fish from a first side of the dam to a second side of the dam.

24. A water mixing apparatus according to claim 23 wherein the turbine bypass mechanism includes a moving vane pump, the moving vane pump including a housing, a rotor mounted eccentrically in the housing, and a plurality of radial vanes mounted on the rotor, the rotor and vanes rotatable to move water through the housing.

25. A water mixing apparatus according to claim 24 further comprising each said radial vane having a distal sealing surface and operable to maintain the distal sealing surface in scaling engagement with the housing as the vanes are rotated in the housing.

26. A water mixing apparatus according to claim 24 wherein the distal ends of the vanes comprise a resilient material.

27. A water mixing apparatus according to claim 24 wherein the resilient material is selected to deform around a non-liquid object passing between the distal end of the vane and the pump housing.

28. A water mixing apparatus according to claim 24 wherein the plurality of radial vanes mounted on the rotor in a helical pattern.

29. A water mixing apparatus according to claim 24 wherein:
the housing includes an inlet opening, the inlet opening having an edge including a resilient material selected to deform around a non-liquid object passing between the vane and the edge of the inlet.

30. A water mixing apparatus according to claim 24 further comprising an inlet valve that is operable to admit water into the water mixing apparatus responsive to a pressure differential between the structure and a surrounding environment.

31. A water mixing apparatus according to claim 23 wherein the distal end of the vane includes a surface spaced apart from the housing.

32. In a dam having an upper portion, a lower portion, and a water intake adjacent the base portion of the dam, a water mixing apparatus for transferring water from adjacent the upper portion of the dam to the water intake, the apparatus comprising:
a surface water inlet operable to receive water from adjacent the upper portion of the dam;
a water discharge adjacent the dam water intake;
an adjustable down tube connecting the surface water inlet and the water discharge, and,
a substantially horizontal conduit communicating with the surface water inlet and the downtube.

33. A water bypass apparatus for a dam comprising:
a dam bypass channel,
a moving vane pump including a housing, a rotor mounted eccentrically in the housing, and a plurality of radial vanes mounted on the rotor, the rotor and vanes rotatable to move water through the housing;
each said radial vane having a distal sealing surface and operable to maintain the distal sealing surface in sealing engagement with the housing as the vanes are rotated in the housing,
the moving vane pump having an inlet remote from the bypass channel and a discharge in communication with the bypass channel;
the vane pump discharge adjustable relative to the bypass channel responsive to a change in elevation of the water inlet relative to the bypass.

34. A water bypass apparatus according to claim 33 wherein the distal ends of the vanes comprise a resilient material.

35. A water bypass apparatus according to claim 33 wherein the resilient material is selected to deform around a non-liquid object passing between the distal end of the vane and the pump housing.

36. A water bypass apparatus according to claim 33 wherein the distal end of the vane includes a surface spaced apart from the housing.

37. A water bypass apparatus according to claim 33 wherein the housing includes a resilient portion adjacent the inlet and operable to deform around an object between the housing and a distal end of a vane.

* * * * *